US007900709B2

United States Patent
Kotliar

(10) Patent No.: US 7,900,709 B2
(45) Date of Patent: *Mar. 8, 2011

(54) HYPOXIC AIRCRAFT FIRE PREVENTION AND SUPPRESSION SYSTEM WITH AUTOMATIC EMERGENCY OXYGEN DELIVERY SYSTEM

(76) Inventor: Igor K. Kotliar, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/726,737

(22) Filed: Dec. 3, 2003

(65) Prior Publication Data

US 2008/0168798 A1    Jul. 17, 2008

Related U.S. Application Data

(63) Continuation-in-part of application No. 09/854,108, filed on May 11, 2001, now Pat. No. 6,401,487, and a continuation-in-part of application No. 09/750,801, filed on Dec. 28, 2000, now Pat. No. 6,418,752, and a continuation-in-part of application No. 09/975,215, filed on Oct. 10, 2001, now Pat. No. 6,502,421.

(60) Provisional application No. 60/461,450, filed on Apr. 9, 2003.

(51) Int. Cl.
*A62C 2/00* (2006.01)

(52) U.S. Cl. ............... 169/45; 169/37; 169/46; 169/61; 169/62; 169/14; 169/44; 244/129.2; 96/134; 95/96; 239/8; 239/418

(58) Field of Classification Search .................... 169/45, 169/56, 61, 37, 46, 62, 14, 44; 62/78, 640; 244/129.2, 135 R; 96/134; 95/96, 130; 239/8, 239/418

See application file for complete search history.

(56) References Cited

U.S. PATENT DOCUMENTS

| 3,948,626 A | 4/1976 | Bragg |
| 4,378,920 A | 4/1983 | Runnels et al. |
| 4,556,180 A | 12/1985 | Manatt |
| 4,681,602 A | 7/1987 | Glenn et al. |
| 4,807,706 A * | 2/1989 | Lambertsen et al. ........... 169/45 |
| 4,896,514 A | 1/1990 | Sugiyama et al. |

(Continued)

FOREIGN PATENT DOCUMENTS

EP    1 062 005  B1    9/1999

OTHER PUBLICATIONS

William M. Cavage, Federal Aviation Administration, Atlantic City, NJ, and Timothy Bowman, Boeing Phantom Works, St. Louis, MO, *Modeling In-flight Inert Gas Distribution in a 747 Center Wing Fuel Tank*, AIAAFDC32143b.pdf, 598 Kb, 13 pages, FAA White Papers.

(Continued)

*Primary Examiner* — Steven J Ganey

(57) ABSTRACT

An aircraft fire-extinguishing system provides automatic fire prevention and/or suppression simultaneously in fuel tanks, cargo compartments and, when needed, in cabin using injection of hypoxic (oxygen-depleted) air produced onboard in an air-separation device utilizing the flow and pressure of the bleed air. The same air-separation device allows supplying passengers and crew with unlimited amounts of oxygen for as long as needed. New methods of a rapid fire suppression utilizing the propulsion of water mist or fire-extinguishing foam by hypoxic air are presented. The combination of water mist or foam with hypoxic air allows to present two innovative fire-extinguishing compositions.

53 Claims, 2 Drawing Sheets

U.S. PATENT DOCUMENTS

| | | | |
|---|---|---|---|
| 5,063,753 | A | 11/1991 | Woodruff |
| 5,220,799 | A | 6/1993 | Lievens et al. |
| 5,273,344 | A | 12/1993 | Volkwein et al. |
| 5,308,382 | A | 5/1994 | Prasad |
| 5,388,413 | A | 2/1995 | Major et al. |
| 5,472,480 | A | 12/1995 | Barbe |
| 5,649,995 | A | 7/1997 | Gast, Jr. |
| 5,730,780 | A | 3/1998 | Booth, III |
| 5,799,495 | A | 9/1998 | Gast, Jr. et al. |
| 5,799,652 | A | 9/1998 | Kotiar |
| 5,921,091 | A | 7/1999 | Foss et al. |
| 6,012,533 | A | 1/2000 | Cramer |
| 6,112,822 | A | 9/2000 | Robin et al. |
| 6,547,188 | B2 | 4/2003 | Schmutz et al. |
| 6,604,558 | B2 | 8/2003 | Sauer |
| 6,634,598 | B2 | 10/2003 | Susko |
| 6,729,359 | B2 | 5/2004 | Jones |
| 6,739,359 | B2 | 5/2004 | Jones et al. |
| 6,739,400 | B2 * | 5/2004 | Lessi et al. ............... 169/46 |
| 6,997,970 | B2 * | 2/2006 | Crome ....................... 96/134 |
| 7,152,635 | B2 | 12/2006 | Moravec et al. |

OTHER PUBLICATIONS

William M. Cavage, Fire Safety Branch, Federal Aviation Administration, William J. Hughes Technical Center, Atlantic City International Airport, NJ, *Modeling of In-flight Fuel Tank Inerting for FAA OBIGGS Research*, 255 Kb, 11 pages, FAA White Papers.

William M. Cavage and Robert Morrison, Fire Safety Branch, Federal Aviation Administration, William J. Hughes Technical Center, Atlantic City Int'l Airport, NJ, *Development and Testing of the FAA Simplified Fuel Tank Inerting System*, Cavage-FAAOBIGGS Develop&Test, 530 Kb, 11 pages, FAA White Papers.

Steven M. Summer, *Limiting Oxygen Concentration Required to Inert Jet Fuel Vapors Existing at Reduced Fuel Tank Pressures*, Aug. 2003, DOT/FAA/AR-TN02/79, 1.8 Mb, 32 pages, FAA White Papers.

William M. Cavage, Fire Safety Branch, Federal Aviation Administration, AAR-422, Building 204, William J. Hughes Technical Center, Atlantic City International Airport, NJ, *Ground-Based Inerting of Commercial Transport Aircraft Fuel Tanks*, RTO__AVT-GBI Paper 761 Kb, 20 pages, FAA White Papers.

William M. Cavage, Fire Safety Section, Federal Aviation Administration, Atlantic City International Airport, NJ, *Modeling Inert Gas Distribution in Commercial Transport Aircraft Fuel Tanks*, AIAA Paper 2002-3032, Report 1300, 600 Kb, 8 pages, FAA White Papers.

Charles C. Graves and Donald W. Bahr, FAA-Propulsion Chemistry Division, *Basic Considerations in the Combustion of Hydrocarbon Fuels with Air*, NACA -1300, 24.04 Mb 26, 267 pages, FAA White Papers.

William M. Cavage, FAA, AAR-422, Fire Safety R&D, Copyright @ 2001 Society of Automotive Engineers, Inc., *Ground-Based Inerting of a Boeing 737 Center Wing Fuel Tank*, SAE-GBI, 281 Kb, 8 pages, FAA White Papers.

Michael Burns, William M. Cavage, Federal Aviation Administration, William J. Hughes Technical Center, Airport and Aircraft Safety, Research And Development Division, Atlantic City Int'l Airport, NJ 08405, *Ground and Flight Testing of a Boeing 737 Center Wing Fuel Tank Inerted With Nitrogen-Enriched Air* DOT/FAA/AR-01/63, 4.91 Mb, 34 pages, FAA White Papers.

Samuel V. Zinn, Jr., Nat'l Aviation Facilities Experimental Center, Atlantic City, NJ, *Inerted Fuel Tank Oxygen Concentration Requirements*, Aug. 1971, FAA-RD-71-42 1.58 Mb, 23 pages, FAA White Papers.

Thomas L. Reynolds, et al., Boeing Commercial Airplanes Group, Seattle, Wash., *Onboard Inert Gas Generation System/Onboard Oxygen Gas Generation System*, May 2001, (OBIGGS/OBOGS) Study NASA/CR-2001-210903 7.75 Mb, 179 pages, FAA White Papers.

Michael Burns and William M. Cavage, Federal Aviation Administration, FAA William J. Hughes Technical Center, Airport and Aircraft Safety, Research and Development Division, Atlantic City Int'l. Airport, NJ, *Inerting of a Vented Aircraft Fuel Tank Test Article With Nitrogen Enriched Air*, Apr. 2001, 2.28 Mb., 29 pages, FAA White Papers.

Steven M. Summer, *Cold Ambient Temperature Effects on Heated Fuel Tank Vapor Concentrations*, Jul. 2000, DOT/FAA/AR-TN99-93, 395 Kb, 13 pages, FAA White Papers.

William M. Cavage, Airport and Aircraft Safety, Research and Development Division, FAA William J. Hughes Technical Center, Atlantic City International Airport, NJ, May 2000, *The Cost of Implementing Ground-Based Fuel Tank Inerting in the Commercial Fleet*, DOT/FAA/AR-00/19, 941 Kb, 60 pages, FAA White Papers.

*A Benefit Analysis for Nitrogen Inerting of Aircraft Fuel Tanks Against Ground Fire Explosion*, Dec. 1999, Final Report, DOT/FAA/AR-99/73 Office of Aviation Research, NTISs, Springfield, VA, 617 Kb, 117 pages.

Steveb M. Summers, *Mass Loading Effects on Fuel Vapor Concentrations in an Aircraft Fuel Tank Ullage*, Sep. 1999, DOT/FAA/AR-TN99/65, 934 Kb, 14 pages.

*A Review of the Flammability Hazard of Jet A Fuel Vapor in Civil Transport Aircraft Tanks*, Jun. 1998, Final Report, DOT/FAA/AR-98/26, 1.04 Mb, 62 pages, FAA White Papers.

Aircraft Accident Report, *In-Flight Breakup Over the Atlantic Ocean Trans World Airlines Flight 800*, National Transportation Safety Board, NTSB/AAR-00/03 7.63 Mb, 341 pages.

Daniel R. Bower, Ph.D., *Flight Test Group Chairman's Factual Report of Investigation*, Jul. 17, 1996, NTSB/SA-516, 96 Kb, 24 pages, FAA White Papers.

Ivor Thomas, *FAA R&D Efforts on Flammability*, Aug. 14, 2002, 2.3 Mb, 27 pages, FAA White Papers.

Alan Levin, *Lower cost, higher risk helped alter FAA stance*, (McLean, VA: Feb. 17, 2004. p. A.03), Copyright 2004 Gannett Company, Inc., USA Today.

Alan Levin, *FAA Suggests Airbus Modify Jets to Reduce Risks; Fuel Tanks Scrutinized*, (McLean VA: Nov. 19, 2003 p. B.03), Final Edition, Copyright 2003 Gannett Company, Inc., USA Today.

Alan Levin, *Jets Must Be Altered, Device Created to Stop Fuel-Tank Explosions*, (McLean VA: Feb. 17, 2004, p. A.01), Final Edition, Copyright 2004 Gannett Company, Inc., USA Today.

Alan Levin, *FAA Device Could Guard Against Terrorism; Experts: Fuel-tank System Could Help Jets Survive Missle Attack* (McLean VA: Feb. 18, 2004, p. A.03) Final Edition, Copyright 2003 Gannett Company, Inc., USA Today.

David Evans,*Safety v. Entertainment*, (Feb. 1, 2003) Avionics Magazine.

Peg Hashem, *Hamilton Sundstrand and Two Units of Cobham to Supply Nitrogen Generation System for Boeing 7E7*, Hamilton Sundstrand, A United Technologies Company, Windsor Locks, Conn., Corporate Press Release (Jul. 1, 2004).

Andrew J. Peacock, *Oxygen at High Altitude*, BMJ 1998; 317:1063-1066 (Oct. 17).

Peter W. Hochachka, *Mechanism and Evolution of Hypoxia-Tolerance in Humans*, The Journal of Experimental Biology 201, 1243-1254 (1998).

J. Hardy Tyson and John F. Barnes, *The Effectiveness Of Ullage Nitrogen-Inerting Systems Against 30-mm High-Explosive Incendiary Projectiles*, Naval Weapons Center, China Lake, CA, Report JTCG/AS-90-T-004, (May 1991).

Charles L. Anderson, *Test and Evaluation of Halon 1301 And Nitrogen Inerting Against 23MM HEI Projectiles*, May 1978, Technical Report AFFDL-TR-78-66, Air Force Flight Dynamics Laboratory, Wright-Patterson Air Force Base, OH.

Paul B. Stewart, Ernest S. Starkman, *Inerting Conditions For Aircraft Fuel Tanks*, Sep. 1955, WADE Technical Report 55-418, Defense Technical Information Center, Defense Logistics Agency, Alexandria, VA.

W.L. Vannice and A.F. Grenich, *Fighter Aircraft OBIGGS Study*, vol. 1, Jun. 1987, Air Force Wright Aeronautical Laboratories, Wright-Patterson AFB, Dayton, OH 45433-6563.

T.C. Knight, J.E. Ritter, *The AH-64A Nitrogen Interting System*, Oct. 31-Nov. 2, 1984, Hughes Helicopters, Inc., Culver City, CA.

Defendant's Answer, Affirmative Defenses And Counterclaims, *Firepass IP Holdings, Inc. and Firepass Coporation*, v. *The Boeing Company*, CV-08-01766 (E.D.N.Y. Jun. 20, 2008).

Aviation Rulemaking Advisory Committee Fuel Tank Inerting, Task Group 3, Jun. 28, 1998.

* cited by examiner

HYPOXIC AIRCRAFT FIRE PREVENTION AND SUPPRESSION SYSTEM WITH AUTOMATIC EMERGENCY OXYGEN DELIVERY SYSTEM

This application claims the benefit of the filing date of the Provisional Application No. 60/461,450 filed 9 Apr. 2003 and is a continuation in part of application Ser. No. 09/854,108, filed May 11, 2001, now U.S. Pat. No. 6,401,487 "Hypoxic Fire Prevention and Fire Suppression Systems with Breathable Fire Extinguishing Compositions for Human Occupied Environments" issued 11 Jun. 2002, application Ser. No. 09/750,801, filed Dec. 28, 2000, now U.S. Pat. No. 6,418,752 "Hypoxic Fire Prevention and Fire Suppression Systems and Breathable Fire Extinguishing Compositions for Human Occupied Environments" issued 16 Jul. 2002, and application Ser. No. 09/975,215, filed Oct. 10, 2001, now U.S. Pat. No. 6,502,421 "Mobile Firefighting Systems with Breathable Hypoxic Fire Extinguishing Compositions for Human Occupied Environments" issued 7 Jan. 2003.

FIELD OF THE INVENTION

The present invention introduces the method, equipment, and composition of Hypoxic Aircraft Fire Suppression System (further referred as HAFSS) that utilizes breathable hypoxic gas mixtures to:
- Provide inerting of fuel tanks
- Provide fire-preventive or suppressive environment in the cargo compartment
- Provide fire-extinguishing atmosphere in the passenger cabin
- Provide a safe and reliable emergency oxygen delivery system With its mode of action based on the controlled release of hypoxic air, this human-friendly system is completely non-toxic, simple and reliable. Consequently, it is ideally suited to provide complete fire protection inside any aircraft.

DESCRIPTION OF PRIOR ART

One of the main safety deficiencies in the passenger airplanes that still remains unresolved is a lack of proper fire fighting and fire preventing equipment.

In fact, it is not the flames associated with fire that can kill most aircrews and passengers in case of fire onboard, but rather the smoke, saturated with toxins such as: benzene, sulfur dioxide, formaldehyde, hydrogen chloride, ammonia and hydrogen cyanide. Although these and other chemicals are lethal, most victims die from carbon monoxide. This color- and odorless gas produced in abundance during fires, especially in enclosed compartments with insufficient ventilation, is extremely fatal even in small concentrations of less than one percent.

Toxic combustion products released in an enclosed compartment such as an aircraft cabin with no readily available escape means are of major concern in the air transport facilities. This concern is of particular importance for passenger aircraft, because of constantly growing airplane capacity and increasing number of passengers that may be exposed.

The proliferation of toxic chemicals in modern advanced materials results in a cabin design completely made of plastics, fabrics, wiring and linings that can only be extremely dangerous when they are heated sufficiently to produce gases. Chances of survival in a toxic environment like this are limited to only a few minutes. Statistical analysis for the last decades shows, that about 70-80 percent of fire fatalities result from toxic smoke inhalation.

A modern passenger aircraft is fully saturated with electric and electronic equipment, interconnected by many miles of wires and cables. Emergencies of various origins can lead to electric shortcut with consequent inflammation of the insulating coat and surrounding flammable materials. This is followed by a massive production of toxic aerosols, which poses the main hazard, according to human fire fatality experience.

While the most important for aircraft survival systems, such as gas turbines and fuel tanks are sufficiently equipped with automatic fire-fighting systems, the passenger cabin and cockpit dramatically lack fire-preventive means. Use of standard fire-extinguishing substances, like Halon 2000 or similar, cannot resolve the problem, because of the high toxicity of the products of their pyrolysis. U.S. Pat. No. 4,726,426 (Miller) teaches such method of fire extinguishing in an aircraft cabin using ventilation ducts from the cargo fire extinguishing system, which would expose passengers to potentially lethal combinations of smoke, fire suppressants and highly toxic products of their pyrolysis.

In case of fire onboard, pilots must complete the emergency checklist, in order to localize the fire origin. A pilot's emergency checklist is too long to let the crew to control fires in the air. For the crew of the Swissair 111 that crashed near Nova Scotia in 1998, killing 299 people, it took 20 min after the first report of smoke till the crush, while the standard checklist needs 30 min to be completed.

It is supposed that oxygen masks would save passengers and aircrew from toxic inhalations. In reality the airline pilots are instructed not to release the masks when the risk of an oxygen-fed fire would exacerbate the situation. Moreover, these masks are practically useless against combustion's poisonous gases. Standard oxygen masks for passenger aircrew and passengers have openings in them to mix the cabin air with the oxygen supply, thereby allowing a direct route for lethal gases to reach the lungs. Furthermore, the oxygen supply in a passenger aircraft provides less than 20% of the oxygen flow required for respiration and lasts only for a few minutes, after which everybody has to die.

Alternative increasing of the fresh air supply, as offered in ECHO Air system of Indoor Air Technologies Inc. in Canada, will only propagate a fire and accelerate lethality. Their patent application provided on www.indoorair.ca teaches that an improved air ventilation system will allow removing contaminated air and supplying fresh air into an aircraft cabin more efficiently. Claiming an improving of the fire safety, they practically improving oxygenation of a fire source.

A recent study of the US Air Line Pilots Association (ALPA) suggests that in the year 1999, on average, one US airliner a day made an emergency landing because of a short circuit, which led to sparking, with resulting smoke and fire in the pressurized cabin. Faulty wiring is the leading culprit.

Some organizations have taken drastic action to deal with the problem. In 1987, the US Navy ordered the removal of the most vulnerable wiring from its planes, and in 1999 NASA grounded its entire fleet of space shuttles when a wiring fault led to a launch being aborted. Yet every day, millions of passengers are still carried by commercial aircraft that are equipped with old wiring that cannot be properly tested for faults. In the US, the Federal Aviation Administration (FAA) has been mounting a probe into the problems that may afflict aircraft that have been flying for more than 20 years. The Aging Aircraft Program has been running since 1988, prompted by an accident in which part of the roof peeled off an elderly Boeing 737 in the sky over Hawaii. In the 1996, TWA flight 800 came down off the coast of Long Island, killing all 230 people on board. Faulty wires inside a fuel tank were blamed as the most likely cause of the explosion. In the wake of that crash, checks on other airlines around the world led to the discovery of several other airplanes in which the insulation on aging wiring leading to sensors in fuel tanks had rubbed away through vibrations, or had been damaged during routine maintenance.

A practical solution of the problem was already previously provided in the U.S. Pat. No. 6,401,487 and No. 6,418,752, which teach a possibility of establishing a hypoxic fire-preventive environment on board of an aircraft during its operation. A fire-suppression system employing a low-pressure storage of the hypoxic fire-extinguishing agent was also described, which provided a base of the current invention.

SUMMARY OF THE INVENTION

The principal objects of this invention are as follows:

The provision of an aircraft fire prevention and suppression system that overcomes the above-described deficiencies in the prior art.

The provision of an onboard system that allows to constantly generating hypoxic air in an air separation device utilizing the pressure and the flow of the engine's bleed air.

The provision of the method and a system that allow to simultaneously providing a fire-preventive atmosphere in fuel tanks, cargo compartments and, in case of emergency, in the passenger cabin.

The provision of a method and equipment to instantly produce and maintain for as long as needed a fire-suppressive hypoxic atmosphere in the cabin of an aircraft, safe to breath without respiratory-support means.

The provision of a method and a system for extinguishing fires using water mist or foam propelled by hypoxic air.

The provision of a reliable emergency oxygen delivery system that deploys automatically in case of fire or cabin depressurization.

DESCRIPTION OF THE INVENTION

This reliable and low-cost solution will allow designing and building fire safe aircraft and is particularly valuable by allowing converting most of existing passenger airplanes into a fire-protected aircraft.

Figure 1:
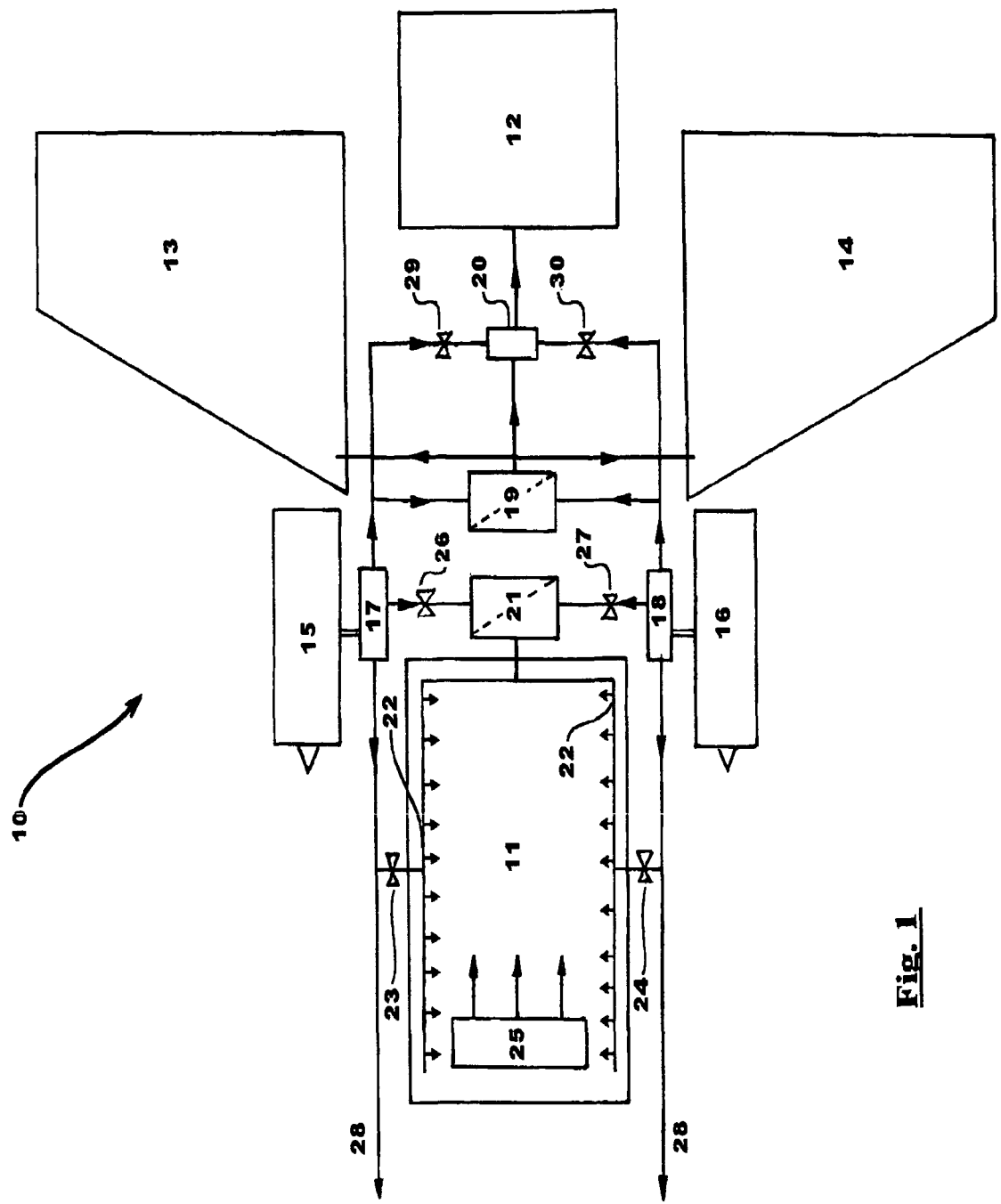
FIG. 1 presents a schematic view of the fire prevention and suppression system integrated into diverse compartments of an aircraft.

FIG. 1 shows a schematic view of the system 10 integrated into different compartments of an aircraft: cabin 11, cargo compartment 12 and fuel tanks 13 and 14. All aircraft components are shown schematically and may vary depending on the aircraft type.

Bleed air supplied by engines 15 and 16 is constantly delivered, via distributors 17 and 18, into the ventilation piping 22 of the cabin 11, air-separation module 19 with mixing device 20 and other technical systems and navigation instruments through the supply lines 28.

The air separation module 19 utilizes pressure and the flow of the bleed air for separating it into an oxygen enriched air (OEA) and hypoxic or oxygen depleted air (ODA). ODA is different from nitrogen enriched air (NEA) used in some industrial applications, since the production technology and the composition of the oxygen depleted air differ from the way of making and the composition of the air with added nitrogen. OEA is normally used by the engine or vented into the outside atmosphere, via a release conduit (not shown on the scheme), or can be supplied, via respiratory masks, to the passengers and the crew. ODA or hypoxic air having oxygen content of 10% (or 8-12% in some applications) is being constantly supplied into fuel tanks 13 and 14 and mixing device 20. This oxygen content guarantees that no ignition of in the fuel tanks is possible.

By mixing ODA having 10% O2 with equal amount of the bleed air in the mixer 20 will provide a mixture having 15.5% O2, which is sufficient to suppress ignition of common combustible materials in the cargo compartments, but enough to keep animals alive. However, if desired, animals can be kept at standard (20.9% O2) conditions in a separate section of the cargo compartment that can be purged with ODA in case of a fire, in which a water mist device can be included in mixing device 20. Using water mist propelled by ODA will allow controlling possible flame immediately upon detection until the fire-extinguishing atmosphere is established.

For instance, the volume of the cargo compartment of a wide-body passenger aircraft is 56 cubic meters with a leakage rate of 1.4 m3 per minute. It means that the ODA flow into compartment 12 must be greater than the leakage rate, in order to keep the fire preventive atmosphere inside. Therefore, each 1 m3/min of ODA with 10% O2 supplied by module 19 will produce 2 m3/min of ODA with 15.5% O2 that will be continuously delivered into compartment 12 in the prevention mode. Similar calculations can be made accordingly to the volume of the fuel tanks.

Modern air separation technology allows building compact and lightweight air separation equipment employing PSA (pressure-swing adsorption) or membrane separation technologies. Suitable hypoxic modules were described in U.S. Pat. Nos. 6,334,315 and 6,418,752 and can be obtained from FirePASS Corporation in New York. Specially designed FirePASS module producing 5 m3/min of ODA with 10% O2 can weight less than 100 kg.

In case of a fire caused by an oxygen-carrying chemical in compartment 12, the bleed air supply to the mixer 20 can be blocked by valves 29 and 30. This will allow supplying ODA with 10% O2 directly from the module 19 into compartment 12. Actually, in some cases, the bleed air supply into mixing chamber 20 can be eliminated together with valves 29 and 30. In this case the required design concentration of oxygen in compartment 12 will be maintained by controlled introduction of hypoxic air with 10% O2, which is possible by installing one or more oxygen monitors/transducers inside compartment 12 that will provide a feedback for controlling the hypoxic air flow into compartment 12. This particular design is most useful for suppression fires in compartment 12 when, in order to save on fuel, the aircraft operator does not desire to run the system in prevention mode.

Module 21 is designed singly to supply ODA having 12% O2 into cabin 11 via ventilation ducts 22 in case of a cabin fire. Normally, module 21 is cut off the bleed air supply by valves 26 and 27 that open only when fire in cabin 11 is detected. Modules 19 and 21 are made using biological multi cell principle from a number of parallel units, which provides for their highest reliability. Air-separation membranes are most recommended in modules for suppression applications, because they are passive, have no moving parts and do not require any energy when not in use. Modules 19 and 21 are made each of multiple oxygen-enrichment or nitrogen-enrichment membranes connected parallel in one unit, so a failure of one membrane does not affect much the performance of the whole device. Though, pressure-swing adsorption (PSA) units are also perfectly suitable for this application and can compete with membranes in product to weight ratio. Suitable membranes and PSA units are available from Hypoxico Inc. and FirePASS Corporation in New York, U.S.A. Alternatively, ODA can be produced using bleed air mixed with nitrogen that can be generated using cryogenic separation of air, which is used in a new type aircraft for production of oxygen utilized for propulsion or for feeding fuel cells in marine and ground applications.

A cabin of a modern wide-body aircraft 11 has a many times higher volume than cargo compartment 12. Therefore, it is quite difficult to provide the fire-suppressive atmosphere inside in a reasonably short time using just an air separation module 21 of a rational weight and size, Thus, there is a need for a large amount of the ODA available immediately, which can be achieved either by increasing the capacity of module 21 or implementing ODA storage container 25. Various designs of such storage containers are described in U.S. Pat. Nos. 6,418,752 and 6,401,487. The most preferred is a soft inflatable storage bag installed behind the ceiling of the cabin 11 and containing sufficient amount of the hypoxic agent under a minor pressure.

The release of the hypoxic agent from its storage container 25 will allow establishing a breathable fire extinguishing atmosphere inside cabin 11 within a few minutes. Once established, this atmosphere will be maintained by the separation module 21 for as long as needed.

The oxygen content in this breathable atmosphere may vary from 15% to 12% depending on situation. Module 21, when in operation with valves 26 and 27 open, is set to constantly produce ODA with 12% O2 that can further be diluted by the bleed air supplied through valves 23 and 24, providing a breathable fire-extinguishing mixture with oxygen content from 12% to 15%.

The initial release of the hypoxic agent from storage 25 should create an atmosphere with preferably 12% O2 in order to provide fast suppression of a flame. This atmosphere is then diluted within a few minutes by the 15% O2 hypoxic air (ODA) from ventilation piping 22 or can be kept at 12% level for a longer period of time, if needed. At this time the OEA from the same module 21 or 19 can be supplied, via respiratory masks, to the passengers and crew.

The emergency OEA supply from 21 and 19 can be provided for as long as needed, which is highly important in a case of a structural damage and depressurization of a wide-body aircraft that cannot land at any airport and sometimes must continue its flight on high altitudes for 2-3 hours. The oxygen content of the OEA after the initial separation in module 21 is about 25-30%. Therefore a secondary oxygen concentrator is installed in or after the module 21 (not shown on FIG. 1), in order to increase the emergency oxygen content to a desired level of 70-90%. The system is automatically deployed when a signal from smoke and fire detection system received or a pressure transducer detects a depressurization of the cabin.

The emergency oxygen supply line and its components are not shown here in order to keep the scheme as simple as possible.

The ODA flow entering cabin 11 via ventilation ducts 22 must be higher than the leakage rate from the cabin 11 and high enough to compensate the addition of OEA via masks, in order to maintain the fire suppressive atmosphere. As it was previously explained in the U.S. Pat. No. 6,401,487, the 15% O2 atmosphere at the aircraft cabin pressure will be still sufficient for human respiration even without OEA masks.

In some types of aircraft, in order to save on weight and volume, a single module 19 can be employed, instead of two, to protect all compartments including the cabin 11. In case of the cabin fire all ODA produced by module 19 will be supplied into cabin 11, leaving fuel tanks and cargo compartments unprotected for a limited amount of time necessary to suppress fire in cabin 11.

Figure 2:
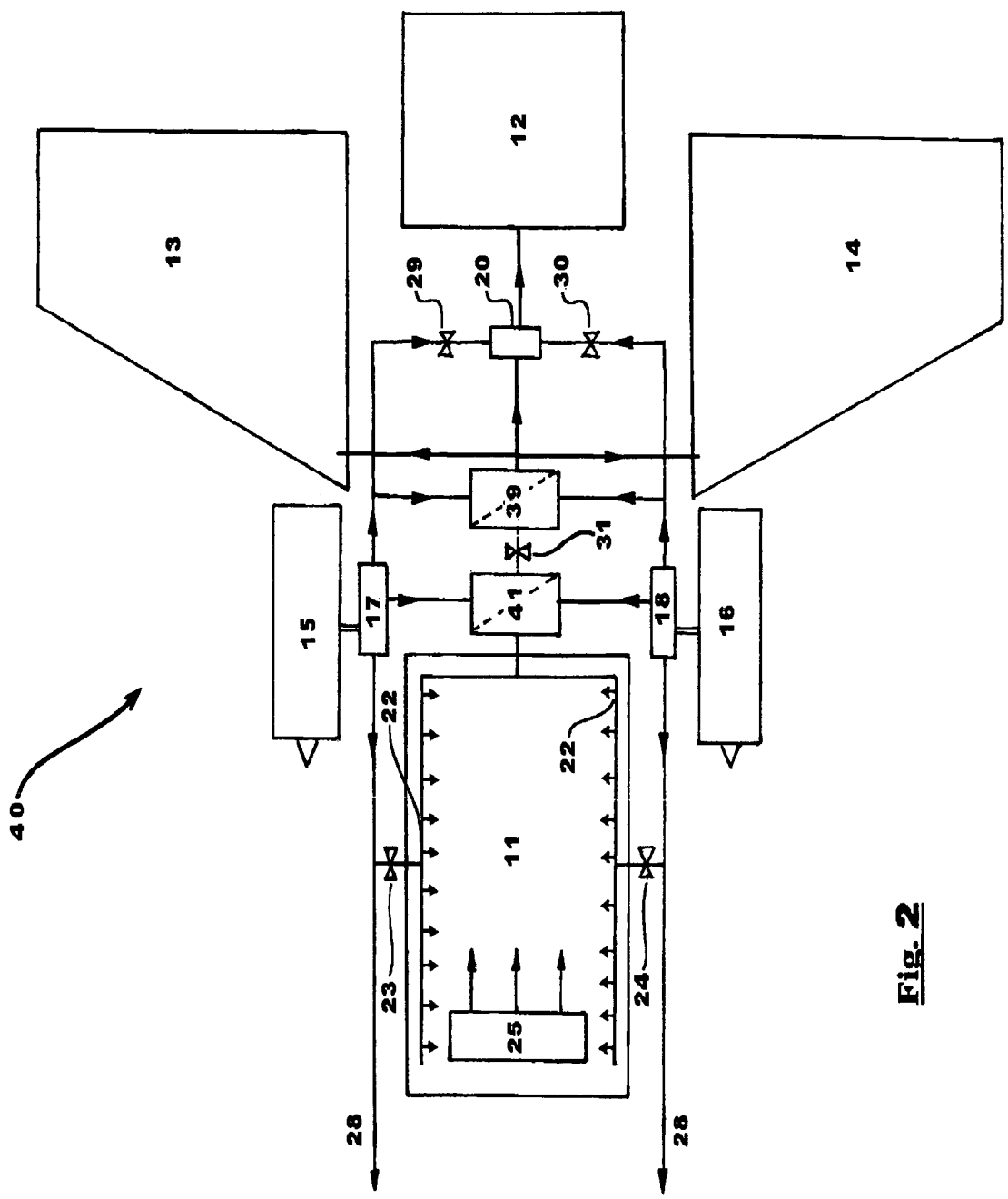
FIG. 2 illustrates an alternate installation scheme of the system for fire prevention or suppression.

FIG. 2 shows an alternate solution, where the module 41 can be normally connected to the inlet or the product outlet of module 39 that in these cases can be made about 50% smaller and lighter than module 19. Both modules produce ODA with oxygen content of 8%-10% that may be increased up to 12% in some applications. There is no need for devices 32 and 33 (shown for suppression mode) since ODA in prevention mode is released directly into compartment 12.

In prevention mode, the oxygen content in cargo compartment 12 is constantly maintained at approximately 12% and about 16% in its animal section. It is achieved by controlling ODA flow from modules 39 and 41 accordingly to the input from a feedback system that monitors oxygen content inside compartment 12. Oxygen monitoring transducers and other components of such a feedback system are widely available from a variety of manufacturers including Hypoxico Inc. in New York.

In suppression mode the cargo compartment is not ventilated with ODA that is supplied only into fuel tanks 13 and 14.

In suppression mode, however, it would require an air-separation module of a significantly larger capacity and weight in order to provide a faster dilution of the internal atmosphere of compartment 12 with ODA. This can be avoided by using water mist propelled by ODA. When smoke or fire is detected in compartment 12, ODA from 39 and 41 is sent into 12 via an optional water mist generating device 32 that draws water from water storage container 33.

Water mist propelled by the hypoxic air from modules 39-41 will allow controlling and extinguishing fires several times faster than hypoxic air or water mist separately. There is a variety of water mist generating devices and nozzles on the market and a design of such a device is not a subject of this invention. However, the propulsion of the water mist with the hypoxic air is a part of the invented system and method. The recommended oxygen content in ODA propelling water mist is 10-12% and can range from 8-15% in general applications and can be as low as 1-8% in special applications. The amount of water in the water tank 33 should be calculated to be sufficient to produce water mist for the period of time needed to establish a fire-extinguishing level of oxygen in the protected compartment.

Alternatively, water mist generating device 32 can be replaced with a foam generating device 32 drawing a foam generating solution from container 33. Foam propelled by ODA will provide the same or even better effect as water mist; however, it might cause some damage to the goods or passengers. Such a hypoxic foam generating system is recommended for use in cargo aircraft. There is a variety of foam generating solutions on the market producing fire extinguishing foams using ambient air or nitrogen. Any of these solutions can be used with hypoxic air. Although, the advantage is that a foam propelled by hypoxic air will extinguish fire almost as fast as the one propelled by nitrogen, but will never produce an environment with oxygen content lower than found in hypoxic air, which is very important in use for normally occupied compartments.

Obviously, the invented hypoxic water mist or foam systems can be used not only in aircraft, but also in extinguishing fires in marine vessels, buildings, all type of vehicles and other enclosed and semi-enclosed structures. Hypoxic water mist or hypoxic foam produced on site by hypoxic air present the fastest and the most appropriate fire-extinguishing compositions that are also a definite part of this invention.

A substantial advantage of such a suppression system is that it can be equipped with extremely sensitive smoke and fire detectors, which is not possible with other single use systems that cannot afford to discharge all the agent in case of a minor emergency. Comparatively, ODA is always available and it provides no damage to goods or people even in combination with the water mist or foam.

In case of a fire emergency in cabin 11, the valve 31 closes and ODA supply from module 41 is redirected into ventilation ducts 22 for mixing with the bleed air supplied via valves 23 and 24. The oxygen content of product entering cabin 11 will range between 12-15%, depending on a situation, and is controlled either manually or by the onboard computerized control system.

As an alternative to the storing ODA in container 25 for suppression, a water mist or foam generating system, similar to 32-33, can be employed. Water mist or hypoxic foam propelled by ODA will provide an immediate control over a fire in cabin 11 and extinguish it far before the dilution of the internal atmosphere with hypoxic air is completed and the safe oxygen content level is achieved.

Both systems 10 and 40 employ fire and smoke detectors, oxygen monitors, pressure transducers, flow regulators, release valves and other necessary components that cannot be shown here. All these necessary components are known to those skilled in the art and are implemented in one computer controlled system that may function fully automatically or with manual control from the main onboard computer.

The smoke and fire detection system provides a signal to a main control panel that, using a data from an oxygen monitoring system, can deploy the release of ODA or hypoxic water mist or foam into a compartment not protected by the prevention system. The same oxygen content monitoring system allows control panel to maintain the oxygen content in protected compartments at the designed level.

The systems 10 and 40 allow providing highly reliable and comprehensive fire safety of an aircraft by simultaneously keeping fuel tanks 13, 14 and cargo compartment 12 always under fire-preventive atmosphere and providing fast and reliable fire suppression in the cabin 11 when needed. The invented methods and systems for extinguishing fires in aircraft are perfectly suitable for extinguishing fires in marine vessels and other vehicles, including spacecraft, submarines and ground vehicles. Obviously they can be used also in buildings, tunnels and other enclosed and semi-enclosed spaces.

The invention claimed is:

1. A method for providing fire prevention in an aircraft having an engine, and a compartment, by producing oxygen-depleted air from a bleed air received from said engine, said method comprising:
   separating said bleed air into an oxygen-enriched gas mixture and an oxygen-depleted gas mixture;
   removing said oxygen-enriched gas mixture by discharging it outside the aircraft;
   supplying said oxygen-depleted gas mixture into a compartment inside said aircraft for establishing therein a hypoxic fire prevention environment; maintaining the oxygen content in said hypoxic fire prevention environment in the range from greater than 12% to approximately 16% of oxygen.

2. The method of claim 1, wherein the aircraft compartment further comprises a cargo compartment, and the method further comprises the step of:
   supplying said oxygen depleted gas mixture into said cargo compartment; and
   maintaining said hypoxic fire prevention environment in said cargo compartment.

3. The method of claim 1, wherein in case of an emergency, supplying said oxygen enriched gas mixture, via respiratory masks, to passengers and crew in said aircraft;
   automatically deploying this supply when a signal from a smoke and fire detection system received or a depressurization of the cabin being detected.

4. The method of claim 2, wherein said cargo compartment is constantly ventilated with said oxygen depleted gas mixture having oxygen content from 12% to 15.5%.

5. The method according to claim 1, further comprising mixing of said oxygen-depleted gas mixture with said bleed air to increase and regulate the oxygen content in said aircraft compartment;
   said hypoxic gas mixture from said mixing device being supplied in amount equal to or larger than any air leaking from said aircraft compartment allowing to maintain a desired oxygen content by ventilating the compartment with said hypoxic mixture.

6. The method according to claim 1, wherein said oxygen-depleted gas mixture is supplied directly into said compartment allowing to achieve and maintain the desired oxygen content by diluting said compartment's atmosphere with the oxygen-depleted gas mixture.

7. The method according to claim 2, wherein
   said oxygen-depleted gas mixture is used to propel water through a special nozzle for generating water mist inside said aircraft compartment to suppress a fire.

8. The method according to claim 2, wherein
   said oxygen-depleted gas mixture is used to propel a foam generating solution through a foam producing device for generating hypoxic fire-extinguishing foam inside a protected compartment.

9. The method according to claim 1, wherein
   a plurality of oxygen-separation membranes is used for separating said bleed air by connecting them in parallel in a single unit, so a failure of one membrane does not affect significantly the performance of the whole device.

10. The method according to claim 1, wherein
    a plurality of pressure-swing adsorption units is used for separating said bleed air by connecting them in parallel in one module, so a failure of one unit does not affect significantly the performance of the whole device.

11. The method according to claim 1, wherein
    providing of a pressurized container having sufficient amount of said hypoxic air in order to flood or accelerate the flooding of said aircraft compartment and establishing there a breathable fire-extinguishing atmosphere in a case of a fire.

12. The method according to claim 1, wherein a cryogenic method is used for producing nitrogen and oxygen from atmospheric air and said oxygen-depleted gas mixture being made by mixing nitrogen with the bleed air.

13. A system for providing fire prevention in an aircraft, said aircraft having an engine, and at least one compartment, by producing oxygen-depleted or hypoxic air, said system comprising:
    an air-separation device receiving air and separating said air into first and second gas mixtures; said first gas mixture being oxygen-enriched air and said second gas mixture being oxygen-depleted air;
    a venting means for releasing said first gas mixture outside the aircraft;

means for supplying said second gas mixture into said compartment for ventilation and maintaining there a constant hypoxic fire-preventive environment in order to prevent ignition that can lead to explosion or fire; wherein the oxygen content in said fire-preventive environment is maintained above 12% and below 16%.

14. The system according to claim 13, wherein the aircraft compartment comprises a passenger cabin, further comprising a pressurized container having sufficient amount of said hypoxic air in order to flood or accelerate the flooding of the passenger cabin and establish there a breathable fire-extinguishing atmosphere in a case of a fire.

15. The system according to claim 13 further comprising
a mixing device for providing, when needed, the mixing of said oxygen-depleted gas mixture with said air in order to increase and regulate the oxygen content in said aircraft compartment;
a smoke and fire detection system with sensors installed in said aircraft compartment;
an oxygen content monitoring system providing oxygen content data in said aircraft compartment; and
a computerized control panel for receiving and analyzing data from the smoke and fire detection and oxygen monitoring systems and regulating the oxygen content in said aircraft compartment.

16. The system according to claim 13 further comprising means for supplying said second gas mixture directly into said aircraft compartment in order to achieve and maintain a designed oxygen content by ventilating the compartment with the oxygen-depleted gas mixture.

17. The system according to claim 13 wherein said second gas mixture having oxygen content greater than 10%.

18. The system according to claim 13, further comprising means for propelling water by said second gas mixture through a special nozzle for generating water mist inside said aircraft compartment.

19. The system according to claim 13 and a foam producing device for generating hypoxic foam inside the protected compartment by propelling foam generating solution with said second gas mixture.

20. The system according to claim 13, wherein
said air-separation device includes a plurality of oxygen-separation membranes connected in parallel in a single unit, so a failure of one membrane does not affect significantly the performance of the whole device.

21. The system according to claim 13, wherein
said air-separation device includes a plurality of pressure-swing adsorption modules connected in parallel in a single unit, so a failure of one such module does not affect significantly the performance of the whole device.

22. The system according to claim 13, wherein
said air-separation device is a cryogenic unit producing nitrogen and oxygen from air and said second gas mixture is made by mixing nitrogen with the bleed air.

23. A method for extinguishing fires using water mist propelled by hypoxic air, said method comprising:
producing hypoxic air in an air-separation device and providing it under pressure for propulsion of water through a water mist generating nozzle;
supplying the system with water for propelling it by said hypoxic air;
producing water mist in a water mist generating nozzle by propelling water with hypoxic air;
when deployed, said system generates and releases water mist inside a protected area, said water mist propelled by said hypoxic air that simultaneously gradually dilutes the internal atmosphere and decreases its oxygen content to a fire extinguishing level;
the oxygen content in said hypoxic air propelling water mist being above 12% and below 16%;
producing water mist for the period of time needed to establish said fire-extinguishing level; said method designated for extinguishing fires in aircraft, marine vessels, buildings, all type of vehicles and other enclosed and semi-enclosed structures.

24. A system for extinguishing fires using water mist propelled by hypoxic air, said system comprising:
an air-separation device providing hypoxic air under pressure for propulsion of water through a water mist generating nozzle;
a water tank for supplying the system with water propelled by said hypoxic air; a water mist generating nozzle producing water mist propelled by hypoxic air;
when deployed, said system generates and releases water mist inside a protected area, said water mist propelled by said hypoxic air that simultaneously gradually dilutes the internal atmosphere and decreases its oxygen content to a fire extinguishing level;
the oxygen content in said hypoxic air propelling water mist being above 12% and below 16%;
the amount of water in said water tank being calculated to be sufficient to produce water mist for the period of time needed to establish said fire-extinguishing level;
said system designated for extinguishing fires in aircraft, marine vessels, buildings, all type of vehicles and other enclosed and semi-enclosed structures.

25. A method of extinguishing fires in aircraft, marine vessels and other vehicles, buildings and tunnels, having a space to be protected said method comprising:
a dilution of the atmosphere in the protected space with hypoxic air having oxygen content below 16% until a fire-extinguishing atmosphere is created;
a maintaining said fire-extinguishing atmosphere at a designed oxygen content level for as long as needed by ventilating said protected space with the hypoxic air with oxygen content ranging from above 12% to 16%.

26. A method of extinguishing fires in aircraft, marine vessels and other vehicles, buildings and tunnels, said method comprising:
a mixture of water mist and hypoxic air having oxygen content above 12% and below 16%; said mixture being generated by propulsion of water through a special mist generating nozzle using hypoxic air;
said mixture, propelled with said hypoxic air, being released into protected area, which allows to rapidly control and extinguish a fire.

27. The system and method according to claim 26, wherein the oxygen content in said composition is maintained in the range from 12-15%.

28. A method for providing a hypoxic fire prevention environment in an aircraft having a compartment comprising:
providing a source of hypoxic air having an oxygen content of less than 16% on board said aircraft;
supplying said hypoxic air into said compartment; and
establishing an oxygen content in said compartment in a range between 10% and 16% during a flight.

29. The method of claim 28 wherein the compartment further comprises a cargo compartment and the establishing step establishes the oxygen content in said cargo compartment in a range of between 12% and 16%.

30. The method of claim 28 wherein the compartment further comprises a fuel tank and the establishing step establishes the oxygen content in said fuel tank in a range of between 10% and 12%.

31. The method of claim 28 wherein the compartment further comprises a fuel tank and the establishing step establishes the oxygen content in said fuel tank in a range above 12% and below 16%.

32. The method of claim 28 wherein providing the source of hypoxic air further comprises receiving a source of air; separating the source of air into an oxygen enriched component and an oxygen depleted component on board said aircraft; wherein said oxygen depleted component comprises said hypoxic air.

33. The method of claim 32 wherein providing the source of hypoxic air further comprises providing a storage container containing hypoxic air under pressure, wherein the step of supplying said hypoxic air further comprises releasing said hypoxic air from said storage container under controlled conditions into said enclosed space.

34. The method of claim 32 wherein the aircraft further comprises a human occupied compartment containing at least one breathing mask, the method further comprising supplying said oxygen enriched component to said breathing mask in said human occupied compartment for human consumption.

35. The method of claim 32 wherein separating the source of air further comprises passing the air through a plurality of oxygen-separation membranes connected in parallel as a single unit.

36. The method of claim 32 wherein separating the source of air further comprises passing the air through a plurality of pressure-swing adsorption units connected in parallel as a single unit.

37. The method of claim 28 wherein providing a source of hypoxic air further comprises cryogenically producing nitrogen and oxygen from atmospheric air, and mixing nitrogen and the atmospheric air to form an oxygen-depleted gas mixture as said hypoxic air.

38. The method of claim 28 wherein the compartment further comprises a passenger cabin, and the establishing step establishes the oxygen content in said passenger cabin in a range above 12% and below 16%.

39. The method of claim 38 wherein the establishing step establishes that the oxygen content in said passenger cabin in a range of between 12% and 16%.

40. An aircraft fire prevention system for
an aircraft having an exterior surface and at least one interior compartment, comprising:
a source of hypoxic air on board said aircraft adapted to be connected to supply said hypoxic air to said at least one interior compartment; and
a hypoxic atmosphere maintained in said at least one interior compartment, said hypoxic atmosphere having an oxygen content of between 10% and 16% at a time during a flight.

41. The system of claim 40 wherein the at least one compartment further comprises a fuel tank.

42. The system of claim 41 wherein the hypoxic atmosphere in said fuel tank further comprises an oxygen content of between 12% and 16%.

43. The system of claim 41 wherein the hypoxic atmosphere in said fuel tank further comprises an oxygen content of between 10% and 12%.

44. The system of claim 40 wherein said source of hypoxic air further comprises a storage container containing hypoxic air under pressure, and a valve for releasing said hypoxic air from said storage container under controlled conditions into said enclosed space.

45. The system of claim 40 wherein said source of hypoxic air further comprises means for separating air into an oxygen enriched component and an oxygen depleted component, wherein said oxygen depleted component comprises said hypoxic air.

46. The system of claim 45 wherein the aircraft further comprises a human occupied compartment containing at least one breathing mask, wherein said oxygen enriched component is adapted to be supplied to said breathing mask in said human occupied compartment for human consumption.

47. The system of claim 45 wherein said separating means further comprises a plurality of oxygen-separation membranes connected in parallel as a single unit.

48. The system of claim 45 wherein said separating means further comprises a plurality of pressure-swing adsorption units connected in parallel as a single unit.

49. The system of claim 45 wherein said source of hypoxic air further comprises a storage container containing hypoxic air under pressure, and a valve for releasing said hypoxic air from said storage container under controlled conditions into said compartment.

50. The system of claim 40 wherein said source of hypoxic air further comprises a storage container containing hypoxic air under pressure, and a valve for releasing said hypoxic air from said storage container under controlled conditions into said compartment.

51. The system of claim 40 wherein the source of hypoxic air further comprises a cryogenic device that produces nitrogen and oxygen from atmospheric air, and means for mixing nitrogen and air to form an oxygen-depleted gas mixture as said hypoxic air.

52. The system of claim 40 wherein the at least one interior compartment further comprises a human-occupied passenger compartment.

53. The system of claim 40 wherein the at least one interior compartment further comprises a cargo compartment.

* * * * *